United States Patent
Shimada et al.

[11] Patent Number: 5,988,781
[45] Date of Patent: Nov. 23, 1999

[54] RECORDING APPARATUS WITH EXCHANGEABLE INTERFACE BOARD

[75] Inventors: Tsutomu Shimada, Musashino; Akiyoshi Shimoda, Yokohama, both of Japan

[73] Assignee: Canon Kabushiki Kaisha, Tokyo, Japan

[21] Appl. No.: 08/378,577

[22] Filed: Jan. 26, 1995

[30] Foreign Application Priority Data

Jan. 27, 1994 [JP] Japan .................................. 6-007826
Jan. 23, 1995 [JP] Japan .................................. 7-008099

[51] Int. Cl.⁶ ............................................... B41J 29/38
[52] U.S. Cl. ............................................... 347/5
[58] Field of Search ................................. 347/5, 108

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 5,223,860 | 6/1993 | Loofbourow et al. ............... 347/88 |
| 5,388,265 | 2/1995 | Volk ......................................... 395/750 |
| 5,485,178 | 1/1996 | Tateyama et al. ..................... 347/5 |
| 5,532,825 | 7/1996 | Lim et al. .......................... 347/108 X |

FOREIGN PATENT DOCUMENTS

| | | |
|---|---|---|
| 54-056847 | 5/1979 | Japan . |
| 59-123670 | 7/1984 | Japan . |
| 59-138461 | 8/1984 | Japan . |
| 60-071260 | 4/1985 | Japan . |
| 5008502 | 1/1993 | Japan . |
| 5058006 | 3/1993 | Japan . |
| 6012200 | 1/1994 | Japan . |

*Primary Examiner*—N. Le
*Assistant Examiner*—Michael Nghiem
*Attorney, Agent, or Firm*—Fitzpatrick, Cella, Harper & Scinto

[57] ABSTRACT

For enabling variation of specification of a recording apparatus with simple construction, a control board fixedly mounted on the recording apparatus has an engine portion for controlling mechanical operation of the recording apparatus and a control portion for controlling the engine portion. Normally, an interface board is connected to the control board to perform recording operation on the basis of recording signal and so forth from a host system. By installing an optional interface board having a control portion in place of the interface board to control the engine portion of the control board, the specification of the apparatus can be varied.

20 Claims, 15 Drawing Sheets

RECORDING APPARATUS WITH EXCHANGEABLE INTERFACE BOARD

BACKGROUND OF THE INVENTION

1. Field of the Invention

The present invention relates generally to a recording apparatus. More specifically, the invention relates to a construction of a control board for the recording apparatus.

2. Description of the Related Art

Personal use of printers as one of typical recording apparatuses has been progressively increasing in recent years. Especially, ink-jet type printers are typical printers for personal use because of relatively compact size and low cost.

In conjunction with growing needs of the printer for personal use, personal computers employing the printers as information output devices have been widely spreading. Also, variation of kinds of information to be handled is increasing.

In this circumstance, a wide variety of specifications have been required for the printers. For instance, depending upon specifications of the personal computers as host systems for the printers, data format to be transferred from the computers are differentiated. Therefore, the printers are required to perform data processing according to the data format.

However, in the conventional printer, the specifications, such as manner of data processing, are fixed, and a difference of specification from the host system inherently requires changing the printer.

Furthermore, for the manufacture of the printer, load on CPU for processing data is differentiated depending upon the kind of characters to be output by the printer. Therefore, the printer manufacture is required to produce different specifications of printers for export to respective countries. This definitely causes inefficiency in manufacture and thus causes high cost.

SUMMARY OF THE INVENTION

In view of the problems set forth above, it is an object of the present invention to provide a recording apparatus which can vary its specification with simple construction.

In a first aspect of the present invention, there is provided a recording apparatus exchanging data with a host system and recording on a recording medium, comprising:

a control board having an engine portion for controlling mechanical operation in the recording apparatus and a first control portion for controlling electrical operation of the engine portion on the basis of the data; and an interface board for exchanging the data with the control board and the host system, detachably installed in the recording apparatus and having a second control portion for controlling the electrical operation of the engine portion.

Here, the recording apparatus may be operative in a first mode where both of the engine portion and the first control portion are active, and a second mode where the engine portion is active and the first control portion is inactive.

The second control portion may control the engine portion in place of the first control portion in the second mode.

The recording apparatus may further comprise a changeover switch within the recording apparatus, and one of the first and second modes is selected on the basis of the state of the changeover switch.

The recording apparatus may further comprise selecting means for selecting one of the first and second modes depending upon a command input from the host system.

The recording apparatus may further comprise an operation panel, and selecting means for selecting one of the first and second modes depending upon a command input through the operation panel.

The recording apparatus may further comprise means for shutting down power supply for the interface board and for maintaining power supply for the engine portion.

In a second aspect of the present invention, there is provided a recording apparatus exchanging data with a host system and recording on a recording medium, comprising:

a control board having an engine portion for controlling mechanical operation in the recording apparatus and a first control portion for controlling electrical operation of the engine portion on the basis of the data;

an interface board for exchanging the data with the control board and the host system, detachably installed in the recording apparatus; and a guide member for guiding installation and removal of the interface board.

Here, the guide member may have guide grooves in symmetry at left and right sides thereof for guiding installation and removal of the interface board.

At least one of the guide members may be detachably attached at a plurality of positions of the recording apparatus.

A plurality of guide members may be attached.

The guide member may be movable along a guide provided on the recording apparatus and can be fixed at any arbitrary position in the guide.

The guide member may be fixed at any arbitrary position in the guide by operation from the outside of the recording apparatus.

The guide member may be fixed at a desired position within the guide by means of a screw.

Different sizes of the interface boards may be installed depending upon the mounting position of the guide member.

The interface boards may be installed at different positions depending upon the mounting position of the guide member.

The recording apparatus may employ an ink-jet recording head for recording by ejecting ink.

With the construction set forth above, the interface board may be exchanged with another interface board having a controller portion and the specification of the recording apparatus can vary depending upon the manner of processing by the control portion.

Also, since the guide member can be installed at various positions, it may facilitate exchanging of the interface board and permit installation of a wide variety of boards.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The preferred embodiment of an ink-jet recording apparatus according to the present invention will be discussed hereinafter with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order not to unnecessarily obscure the present invention.

Figure 1:
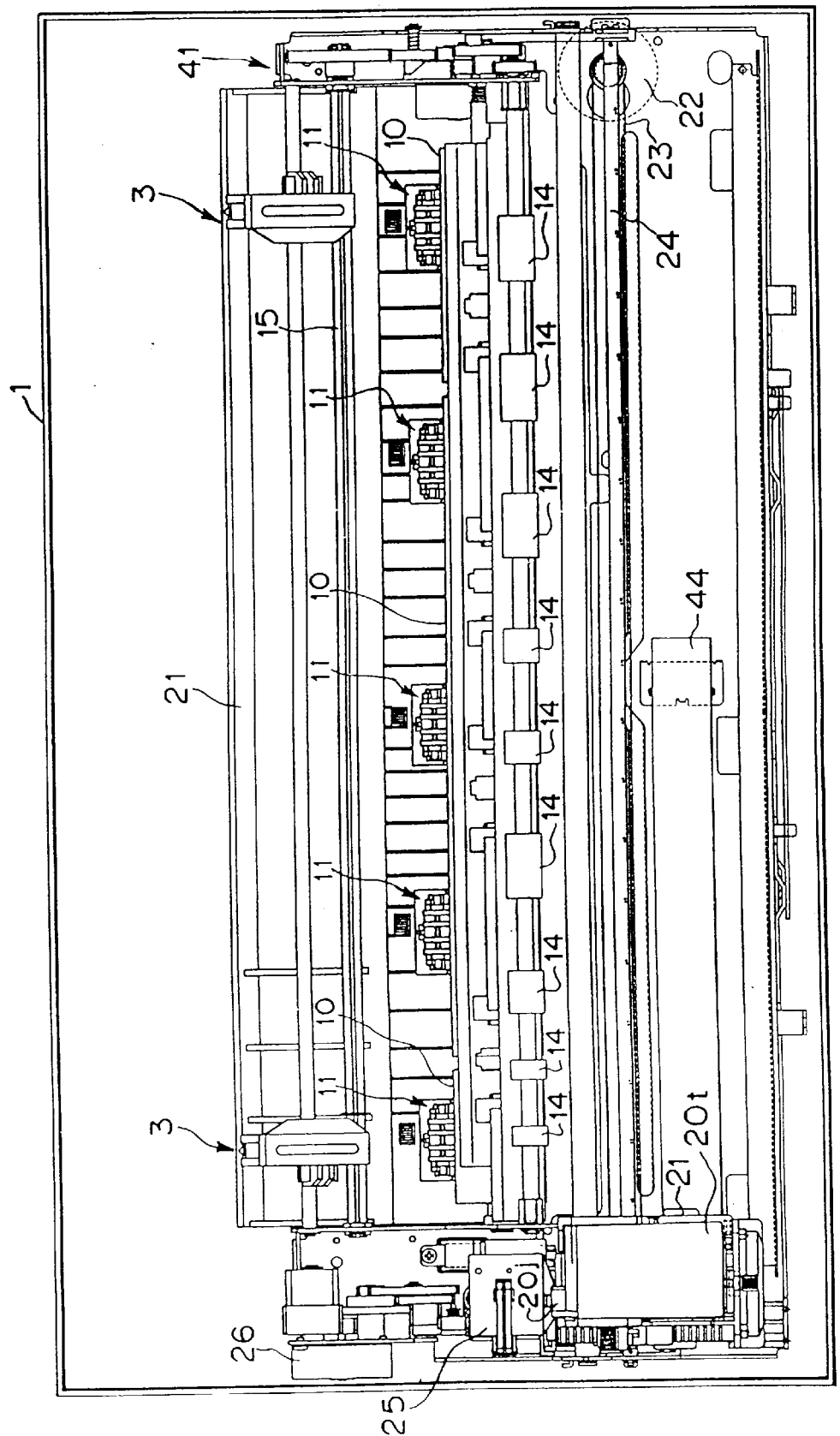
FIG. 1 is a top plan view of the preferred embodiment of an ink-jet recording apparatus without its upper cover according to the present invention.
Figure 2:
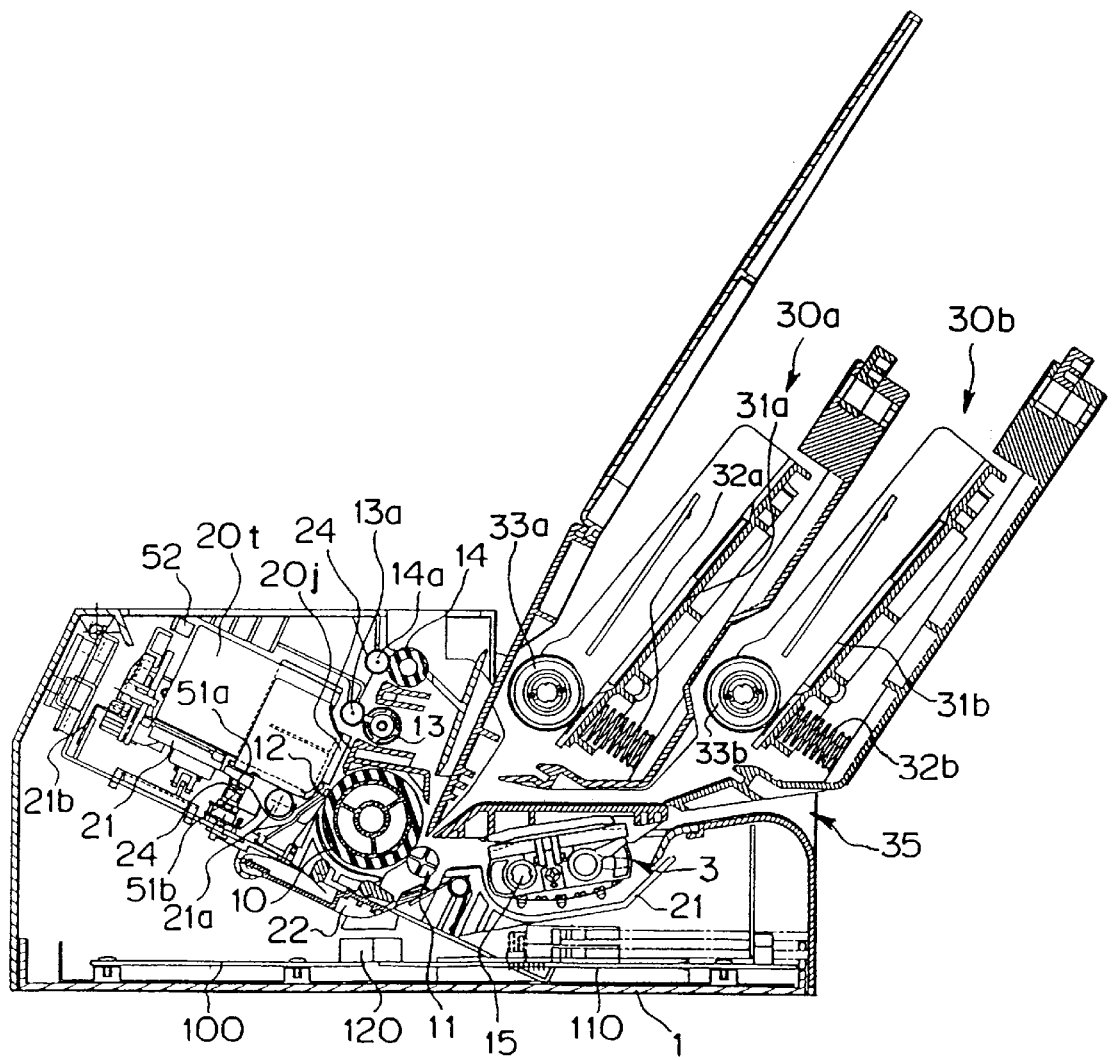
FIG. 2 is a sectional side view of the preferred embodiment of an ink-jet recording apparatus according to the invention.

FIGS. 1 and 2 show the preferred embodiment of an ink-jet recording apparatus according to the present invention. FIG. 1 is a top plan view of one embodiment of an ink-jet recording apparatus without an upper case according to the present invention, and FIG. 2 is a section in a condition where an automatic sheet feeder (hereinafter referred to as "ASF") is installed, as seen from the side of the apparatus.

The shown embodiment of the ink-jet recording apparatus may use a cut form, such as a recording paper, post card and so forth (hereinafter also referred to as "cut sheet") and a continuous paper, such as a fanfold paper and so forth.

Namely, when a cut sheet is used, feeding of paper is normally performed by automatic feeding by means of the ASF or by manual feeding. As is clear from FIG. 2, the ASF has two bins 30a and 30b. By these bins 30a and 30b, it is enabled to simultaneously set mutually different sizes of cut sheets and to use two sizes of cut sheets selectively by selecting operation of the user, for example. Sheet feeding mechanisms in respective bins 30a and 30b have mutually identical constructions. Namely, a plurality of cut sheets (which is neglected from illustration in FIG. 2) stacked on pushing plates 31a and 31b is urged toward pick-up rollers 33a and 33b by depression force of springs 32a and 32b. The cut sheet is separated and fed in one-by-one by the pick-up rollers 33a and 33b rotating in response to a sheet feeding initiation command.

When the cut sheet is used, a register roller 11 is set to be urged toward a feed roller 10 in response to operation of a release lever. By this, the cut sheet fed from the ASF is fed by the feed roller 10 to a recording region side through a feeding path defined around the feed roller 10. At the recording region side, a paper holding plate 12 is urged toward the feed roller 10 by resilient force of a leaf spring to further apply a feeding force to the cut sheet to feed between an ink-jet head 20j and a platen 24. Feeding of the cut sheet at this position is performed intermittently per every one scan of the ink-jet head 20j (will be discussed later), and the feeding amount generally corresponds to an arrangement length of a plurality of ink ejection nozzles provided in the ink-jet head 20j in the feeding direction of the cut sheet.

The cut sheet, on which ink-jet recording is performed by feeding per every one scan and ink ejection from the ink-jet head 20j, is sequentially fed upward in the apparatus by rotation of an assist roller 13 and a take-off roller 14 (and spurs 13a and 14a depressed by the assist roller 13 and take-off roller 14).

When the continuous paper is used, the ASF is not used and the continuous paper fed through a feed opening 35 is fed by driving of a pin drafter 3. At this time, the register roller 11 is released from biasing toward the feed roller 10 by the above-mentioned release lever. The continuous paper fed to the recording region side is intermittently fed per every one scan of the ink-jet head 20j to be fed upward of the apparatus similarly to the foregoing case of the cut sheet. During feeding through the recording region, ink-jet recording is performed.

The ink-jet head 20j has 136 ink ejection nozzles arranged in alignment. An ejection nozzle array is oriented substantially along the feeding direction of the recording medium as installed on a carriage 21 (hereinafter, this direction where the ejection nozzle array is oriented is referred to as "auxiliary scanning direction").

In the shown embodiment, the ink-jet recording apparatus is adapted to perform full color printing employing yellow (Y), magenta (M), cyan (C) and black (Bk) inks, and monochrome printing employing Bk ink.

In the construction for performing full color printing, the ink-jet head 20j and ink tanks 20t storing respectively Y, M, C and Bk inks are independently installed on the carriage 21 in detachable fashion. Namely, for example, when Y ink is spent out, or its tank becomes necessary to be exchanged, only the ink tank 20t of the Y ink need be exchanged with new one. Also, when it becomes necessary to exchange the ink-jet head 20j, only its ink-jet head need be exchanged.

In the construction set forth above, the 136 ink ejection nozzles of the ink-jet head 20j are corresponding to respective inks per every given number. Corresponding to this, ink chambers and ink supply passages are defined independently of the others.

On the other hand, in the construction for performing monochrome printing, the ink-jet head 20j and the ink tank 20t of the Bk ink are formed integrally. These are detachably installed on the carriage 21 as a unit.

As set forth above, the carriage 21 with the installed ink-jet head 20j and ink tank 20t is driven to move by a driving force of a carriage motor 22 transmitted via a belt 23 connected to a part of the carriage 21, as shown in FIG. 1. The carriage 21 is permitted to move as set forth above along a guide shaft 21a extending in the lateral direction by engaging with the guide shaft 21a and guide piece 21b. By this, it becomes possible to perform scanning for recording.

The carriage 21 is moved to a home position located at a left side position of FIG. 1 during non-recording (resting) state. Then, as shown in FIG. 1, the surface of the ink-jet head 20j where the ejection nozzles are arranged, is capped by a capping unit 25.

Motion information of the carriage 21 is detected by optical or magnetic encoder elements 51a and 51b mounted on the carriage 21 at both sides of an encoder film 24 provided in parallel to the guide shaft 21a and so forth (see FIG. 2). Also, exchange of electrical signal between the apparatus main body and the ink-jet head 20j is performed through a flexible circuit board 44.

A reflection type sensor 52 (see FIG. 2) is provided at a part of the apparatus body and adapted to read bar code information attached to the ink tank 20t or the ink-jet head 20j. By this, it becomes possible to identify the individual ink tank 20t or ink-jet head 20j.

An ASF motor 26 (see FIG. 1) provided at the home position side of the apparatus main body is adapted to drive the above-mentioned pick-up roller as well as an absorption pump in the capping unit 25. On the other hand, the driving force necessary for driving the feed roller 10 and feeding of the feed roller 10, can be attained from an LF (line feed) motor through an unshown gear train 41 (see FIG. 1) provided at the opposite side to the home position.

On the chassis 1 forming the bottom plate of the apparatus body, a control board 100, an internal interface board 110, and a connector 120 for mutual connection with the control board and the interface board, are provided.

Figure 3:
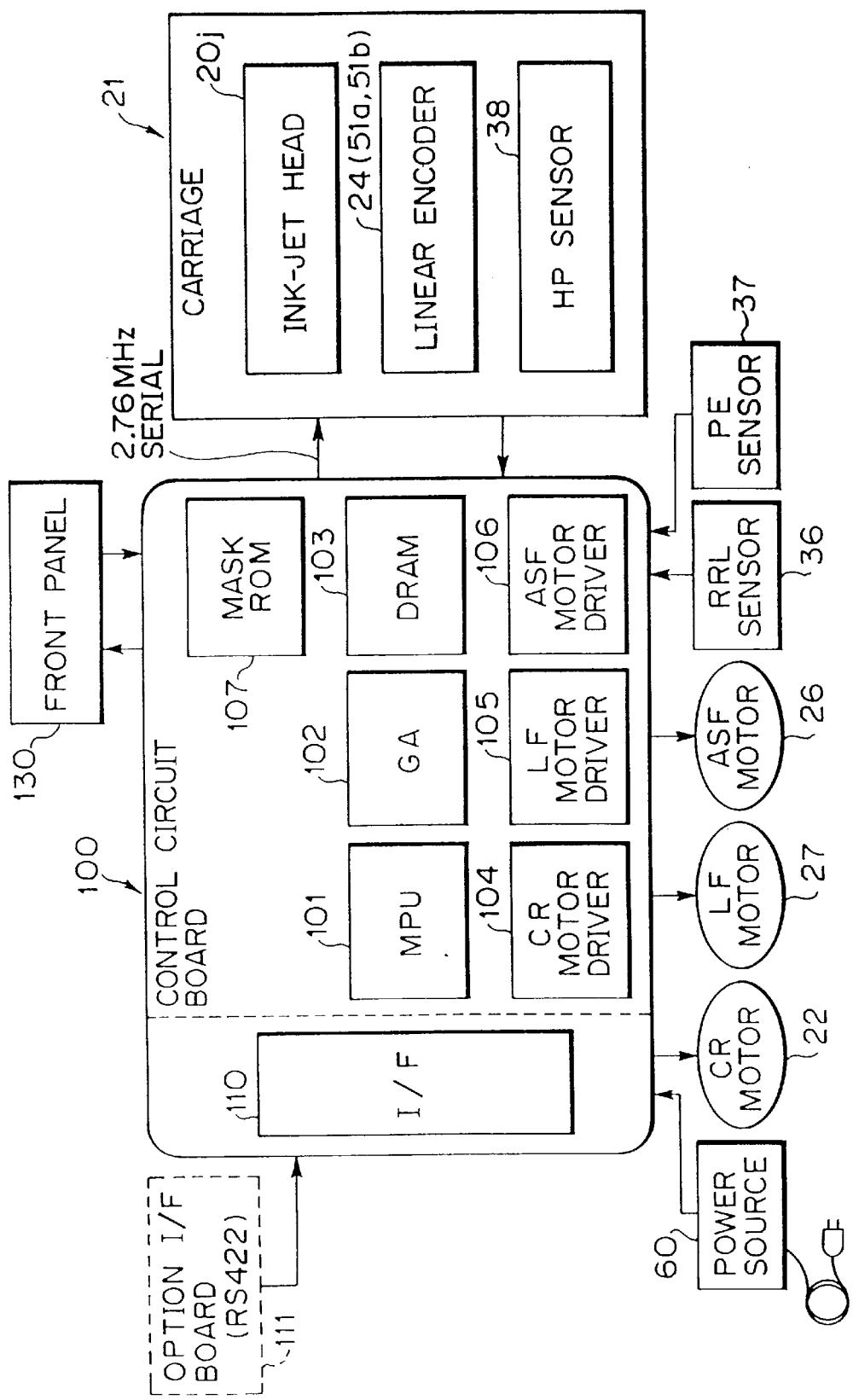
FIG. 3 is a block diagram showing a construction for a control system for the apparatus as shown in FIG. 2.

FIG. 3 is a block diagram mainly showing a construction of a control system of the ink-jet recording apparatus shown in FIGS. 1 and 2.

The control board 100 is in the form of a printed circuit board. As shown in FIG. 2, the control board 100 is loaded at the bottom portion of the apparatus main body. On the control board 100, MPU 101, a gate array (GA) 102, a dynamic RAM (DRAM) 103 and a maskable ROM (MASKROM) 107 are provided. Also, a drive circuit for respective motors, namely carriage motor driver (CR motor driver) 104, a sheet feeder motor driver (LF motor driver) 105, and an ASF motor driver 106 are provided. Also, to the control board 100, a similarly printed circuit board form Centronics interface (I/F) board 110 is connected. By this, it becomes possible to receive recording data and so forth from a host system.

It should be noted that in the shown embodiment of the ink jet recording apparatus, it is possible to connect different specifications of I/F board 110. By this, it becomes applicable for a variety of host systems. Also, it is possible to provide other data processing functions.

In the control board 100, the MPU 101 performs data processing converting for the overall apparatus. The MASK-ROM 107 stores this processing procedure. Also, DRAM 103 is used as a work area for the above-mentioned data processing. In the gate array 102, various circuits relating to the processes of the MPU 101 are formed. MPU 101 converts image data transferred from the host system via the I/F 110 into ejection data to be used in the ink-jet head 20j and performs operation for transferring the ejection data to the drivers of the ink-jet head 20j corresponding to the ejection timing. Also, the MPU 101 drives respective motors 22, 27 and 26 via respectively corresponding drivers 104, 105 and 106. Particularly, drive control of the CR motor 22 is performed together with the ejection timing control on the basis of the linear encoder information obtained through the carriage 21 as discussed later.

In addition, the MPU 101 performs a process relating to key input and information display on a front panel and processes based on the detection information from a home position (HP) sensor 38, a release lever (RRL) sensor 36, a paper end (PE) sensor 37.

Discussion will be given for the construction for changing specifications of one embodiment of the ink-jet recording apparatus (printer) with reference to FIG. 4.

Figure 4:
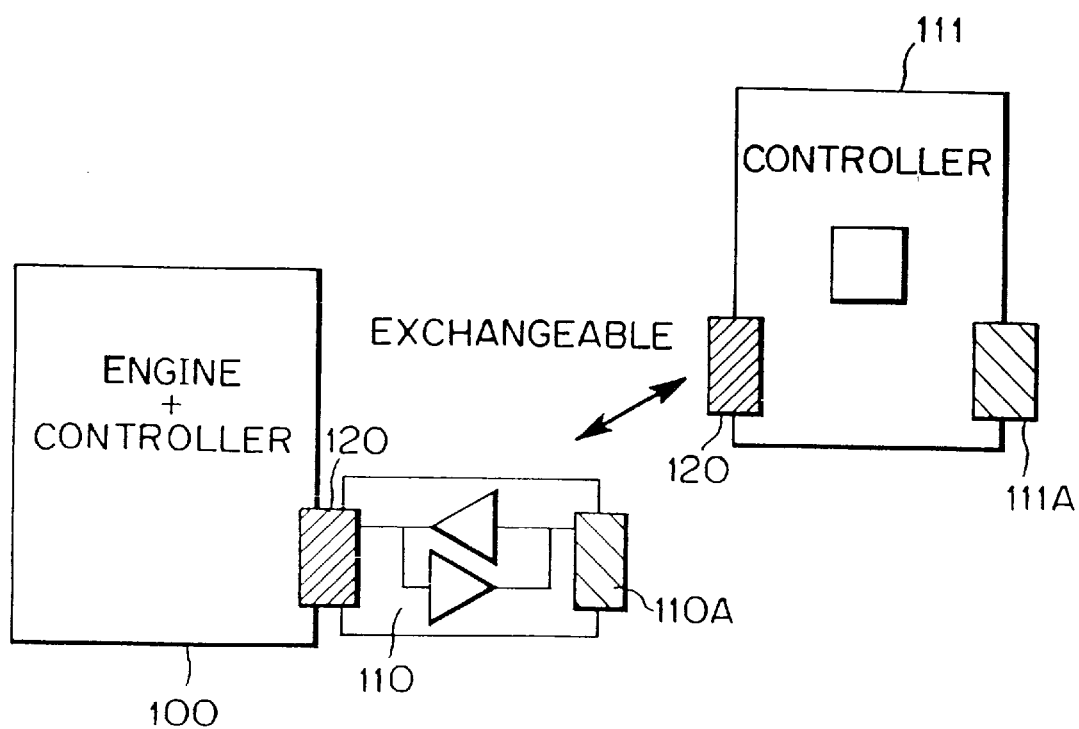
FIG. 4 is an explanatory illustration showing a construction for varying specifications of the shown embodiment of the ink-jet printing apparatus of the invention.

In FIG. 4, the control board 100 includes an engine portion for controlling basic components of the printer, such as the feeder motor and carriage motor as discussed with respect to FIG. 3, the AS motor and ink-jet head, and a control portion processing recording data and/or control data input via interface and controlling the engine portion.

As discussed with respect to FIGS. 3 and 4, the control board 100 is connected with the interface (I/F) board 110 via the connector 120. The I/F board 110 has mechanical and electrical interfacing functions for connection with the desired host system. Namely, the I/F board 110 has the connector adapted to the host system for exchanging signals to be transmitted and received between the host system. Data communication between the I/F board 110 and the control board 100 is performed in parallel bidirectionally. In case of a parallel I/F, the engine portion may perform its function even when only the engine portion is provided in the control board 100 by only adding a buffer.

When the I/F board 110 is fixedly provided, the specifications of the printer are also fixed. In contrast to this, in the shown embodiment, another I/F board 111 may be installed in place of the I/F board 110. The I/F board 111, in addition to the I/F function portion, includes the control portion for performing complicated data processing, such as Chinese character (Kanji) processing and so forth. When the I/F board 111 is mounted on the control circuit 100, only the engine portion of the control board 100 becomes active and the control portion is held in inactive state. By this, the engine portion of the control board 100 may be controlled by the control portion of the I/F board 111.

As set forth above, by constructing the desired control portion on the I/F board, the common engine portion can be widely used for mutually different data processings. Also, it becomes possible to adapt the data processing of the engine portion for the data from the host having different specifications of I/F by the I/F board 111.

The control portion of the I/F board 111 and the engine portion of the control board 100 exchanges command and status through a parallel bidirectional I/F.

The recording data as data other than the command and status has relatively large amount of data and thus requires to be transferred from the control portion to the engine portion at high speed. The shown embodiment of the recording apparatus has a DMA (direct memory access) transfer function for sequentially transferring the recording data in the amount determined by the command from the control portion to the engine portion by hardware.

The control board 100 is provided with capability to change over operation of both the control portion and the engine portion or only the engine portion. Therefore, the control board 100 can be easily adapted to the forthcoming new I/F. When an application is preliminarily determined, it becomes possible to fix the operational mode by the typical hardware switch to form a dedicated apparatus for a specific application. In the case where the recording apparatus is in service for a wide variety of users with selectively connecting a plurality of kinds of I/F boards, the operational mode may be switched by a command. When it is desired to reduce steps in development for modifying the dedicated recording apparatus for special applications, the operational mode may be switched by a hardware switch for adapting operation. For example, the shown embodiment of the recording apparatus may be desired to take the former construction in the application for use as a printer connected to the personal computer, and to take the latter construction in the case where the recording apparatus is to be modified for special applications, such as a use as plotter or a dedicated recording apparatus for construction drawing.

Figure 5:
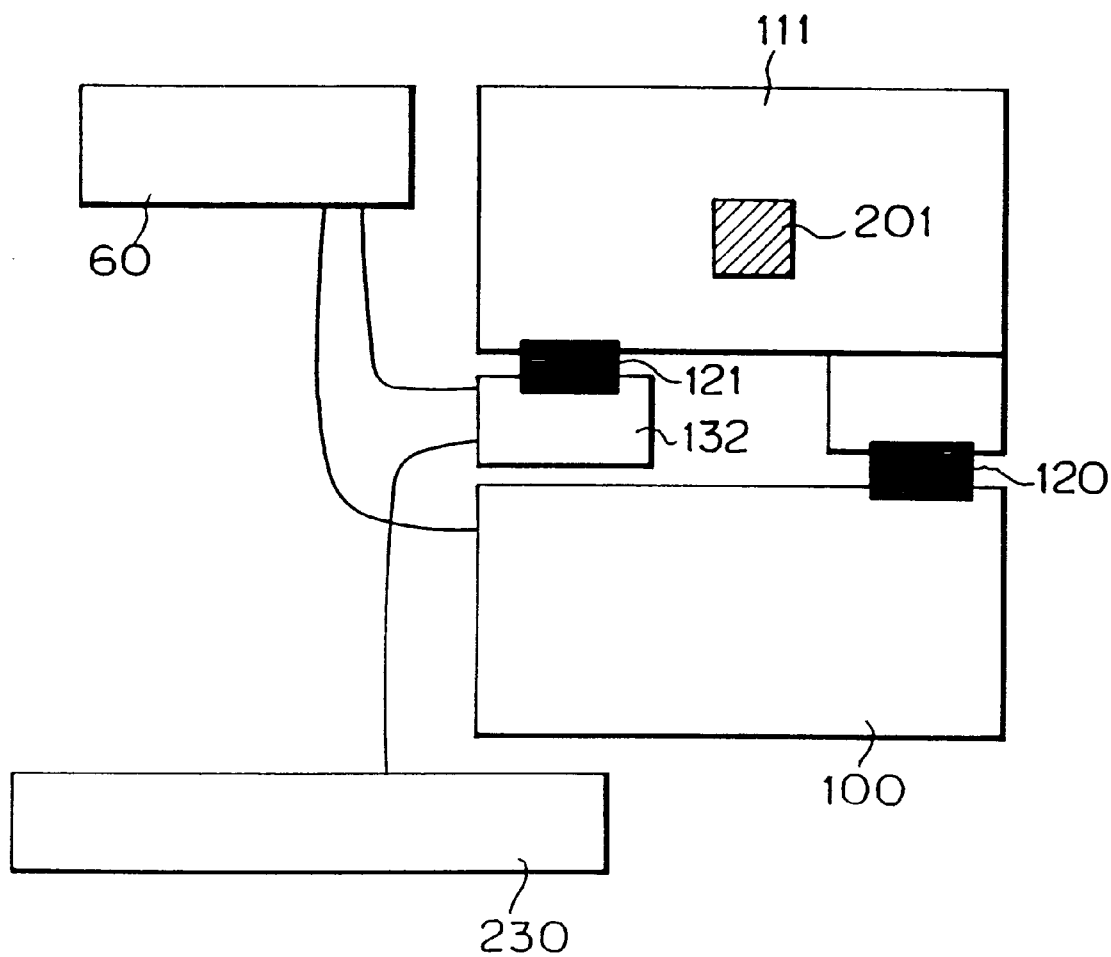
FIG. 5 is a block diagram showing a construction of a control circuit, to which the interface board is attached.

FIG. 5 is a block diagram showing a construction of the control circuit to be connected to the I/F board 111. The control circuit shown in FIG. 5 is directed to a modification for special application.

The I/F board 111 is provided for adapting with different I/F specifications to perform predetermined process for the data input from the host system and transfer data in a given form to the control board 100. A board 132 is a connection board installed in the recording apparatus and connected to an operation panel including a power switch. So as to permit use of an operation system adapted to the host system, the board 132 directly connects the operation panel 230 to the I/F board 111. The connection board 132 further receives power for the I/F board 111 from the power source unit 60.

The I/F board is connected to the control board 100 via the connector 120 and to the operation panel 230 and the power source unit 60 via a connector 121.

Operation commands and information to be output to the control board 100 input from the operation panel 230 are processed by MPU 201 formed on the I/F board 111. The MPU 201 performs overall data processing on the I/F board 111 in place of the control portion of the control board 100.

In order to establish the optimal recording condition, the engine portion of the control board 100 protects the recording head while the recording apparatus is not in use. The engine portion may be provided with a timer function and so forth so as to enable detection of elapsed time from previous use. For this reason, the engine portion is constantly supplied with power.

The control portion is not active when the recording operation is not performed, namely, no data is input from the host system. Therefore, it is unnecessary to be constantly supplied with power. In the shown construction, since the I/F board 111 having the control portion and the control board 100 having the engine portion are mutually independent boards, it is easy to supply the power separately. Therefore, the power source unit 60 is connected to the control board 100 and the connection board 132 independently. The power source unit 60 is connected to the I/F board 111 via the connection board 132 and performs switching of the power by a control signal from the control board 100. On the other hand, the power source unit 60 constantly supplies the power to the control board 100.

A user may perform switching of the power source of the recording apparatus through the operation panel 230. The control board 100 monitors the state of the power source switch on the operation panel via the connector 120. When change of state of the power source switch is detected, the control board 100 controls the power source unit 60 to perform switching of power supply for the I/F board 111.

A timing for shutting down of the power supply is adjusted by communication between the control board 100 and the I/F board 111. The state of the power source switch may be monitored either solely by the control board 100 or by both of the control board 100 and the I/F board 111. It is also possible to detect the operation of the power source switch by both of the control board 100 and the I/F board 111 independently of each other to transmit the power off processes. It is further possible to recognize the operation of the power source switch by the engine portion and the control portion through communication, and effect shutting down after completion of necessary processes.

On the other hand, upon initiation of power supply, power is not supplied to the I/F board. Therefore, monitoring of the state of the power source switch is performed by the control board 100. When operation of the power source switch from the off state to the on state is detected, the control board 100 controls signals connected to the power source unit 60 for supply to the I/F board 111. In response to initiation of power supply, the I/F board performs initialization of the circuit and start communication with the control board.

In negotiation upon starting communication, the I/F board 111 transfers its own specification to the control board 100 by a predetermined command. The control board 100 makes discrimination of the specification of the I/F board 111 to determine the operation mode. In the shown embodiment, in predetermined operation modes, the fixed control board operates only as the engine portion. On the other hand, when negotiation is not performed with a given period, the control board makes judgement that certain failure is caused on the I/F board 111 to terminate power supply for the faulty board.

Figure 6:
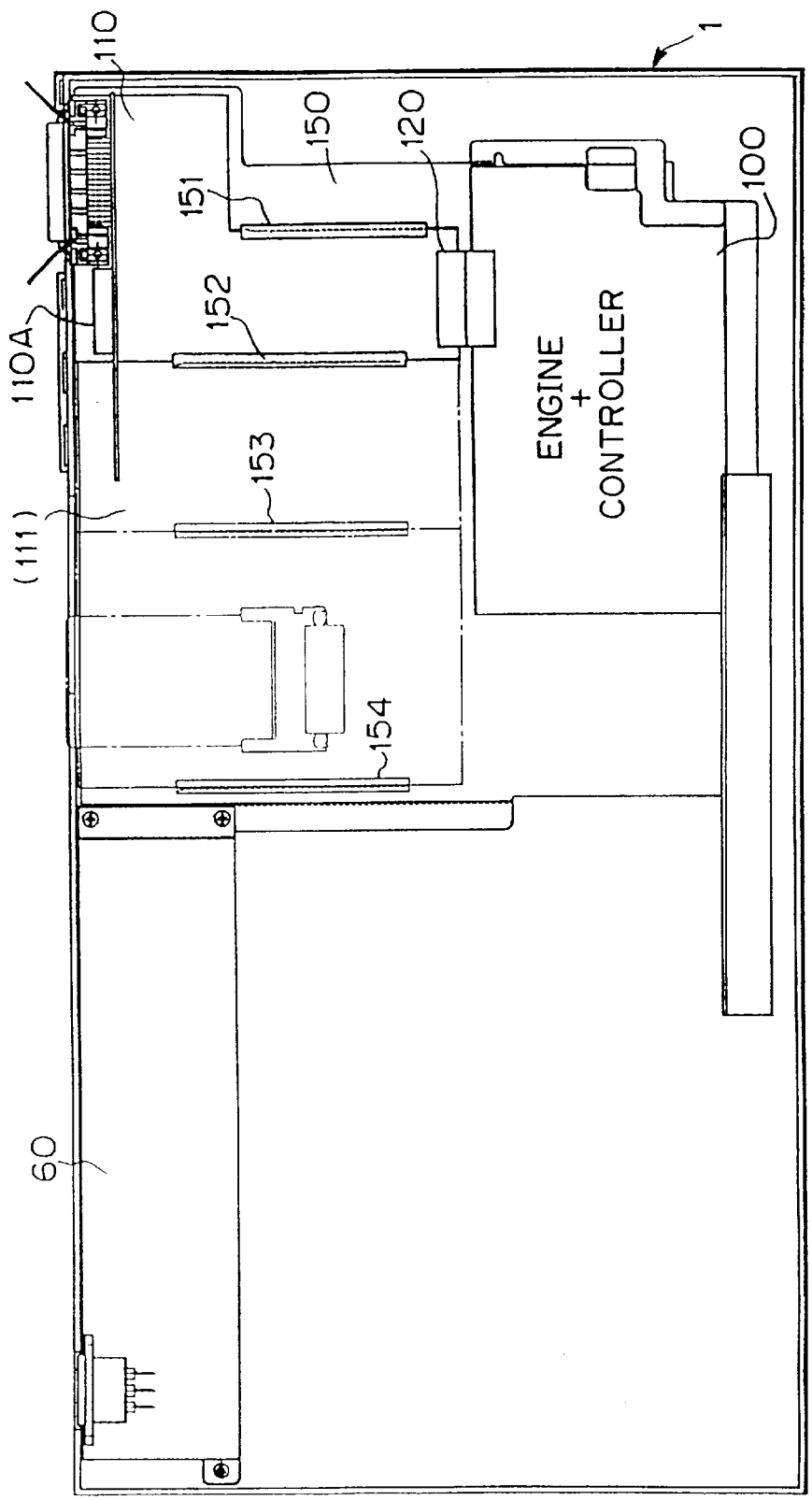
FIG. 6 is a bottom plan view of the apparatus for showing construction for installation of the board to be varied.

FIG. 6 is an illustration showing a mechanical construction for exchanging the I/F board and is a bottom view of the apparatus illustrated in FIGS. 1 and 2. On the lower case 1 forming the bottom of the main body of the apparatus, a shield plate 150 is mounted. On the shield plate 150, the control board 100, the I/F board 110 and the connectors 120 and so forth to be connected to the I/F board 110 and the control board 100 are mounted.

The control board 100 is rigidly secured on the shield plate 150 by means of fastening screws. A guide rail 151 is integrally formed with the lower case 1. Also, on the shield plate 150, a guide rail 152 is detachably mounted. Along these two guide rails, the I/F board 110 is movably mounted so that the I/F board 110 is connected to the control board 100 via the connector 120 and can be removed therefrom.

Figure 7:
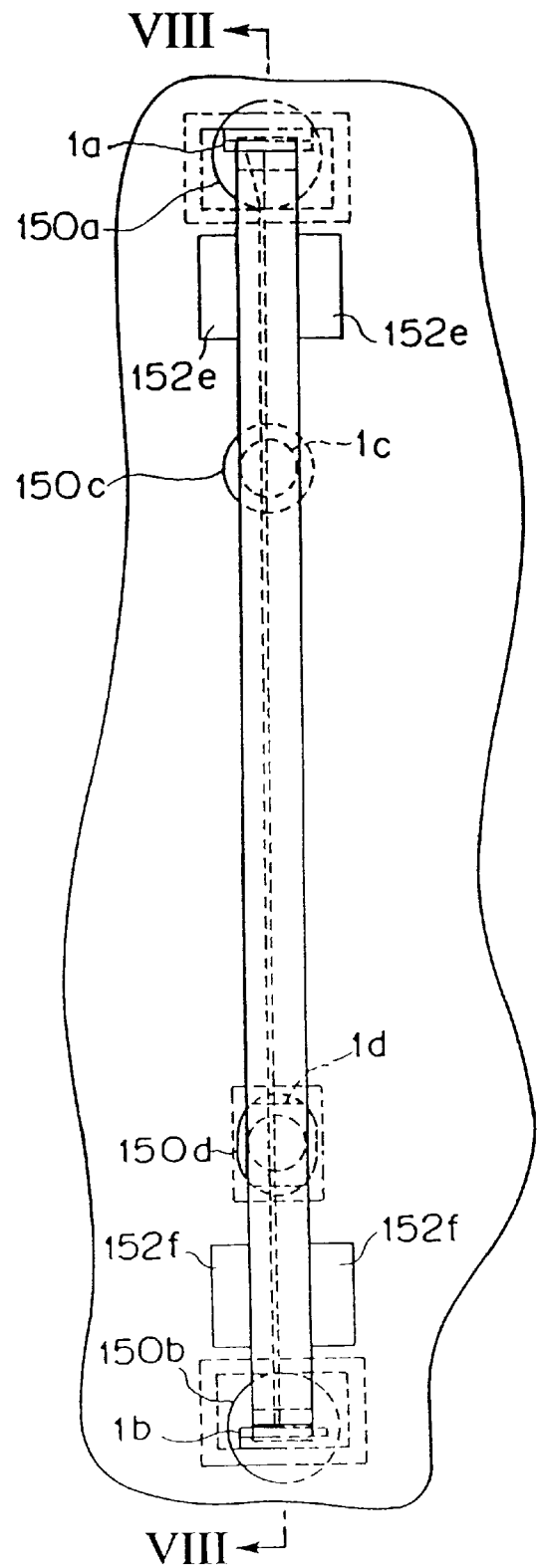
FIG. 7 is an illustration showing a detail of a circumferential portion of a guide rail.
Figure 8:
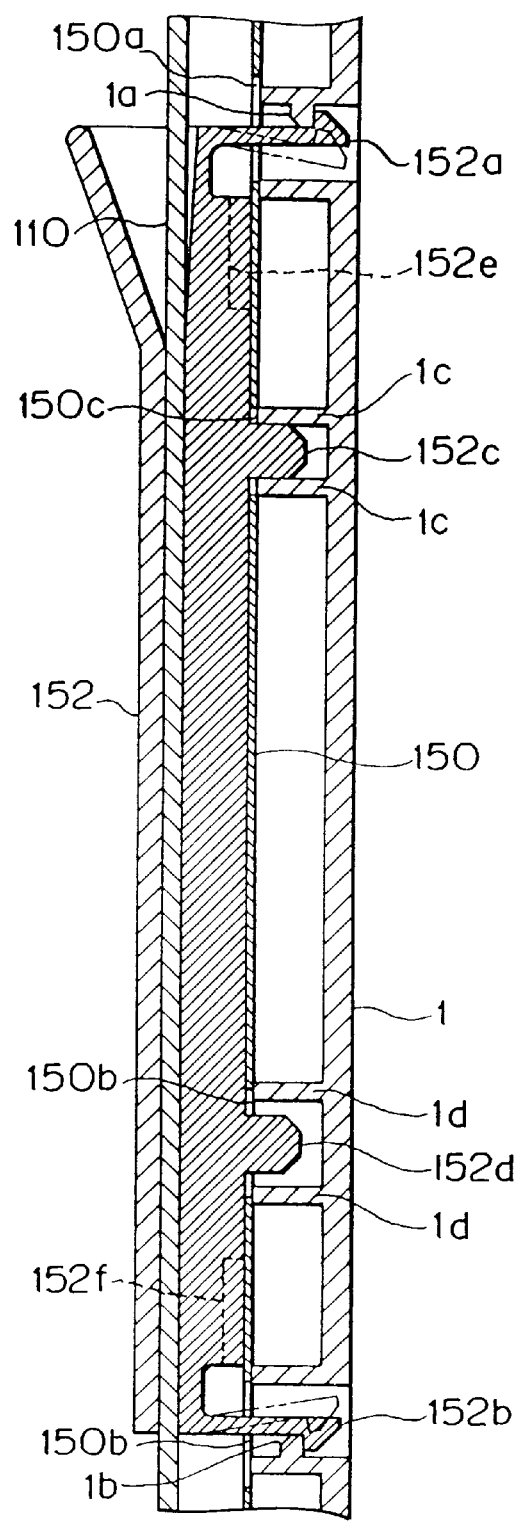
FIG. 8 is a section taken along line VIII—VIII of FIG. 7.

Discussion will be given for manner of mounting of the guide rail 152 in FIG. 6. FIG. 7 shows a detail around the guide rail 152, and FIG. 8 is a section taken along line VIII—VIII of FIG. 7.

In the shield plate 150, holes 150a, 150b, 150c and 150d are formed respectively at positions corresponding to hooks 1a, 1b and holes 1c and 1d of the lower case 1. The guide rail 152 is provided with hooks 152a and 152b. Dowels 152c and 152d of the guide rail 152 are inserted into holes 1c and 1d formed in a form of ribs in the lower case 1. The dowel 152c is adapted for positioning the guide rail 152. On the other hand, dowel 152d is adapted to restrict rotational direction of the guide rail 152. Since the hooks 152a and 152b are deformable as illustrated by two-dotted lines, the guide rail can be set from the upper side of the lower case, in one action. The guide rail 152 is stably secured on the lower case by flanges 152e and 152f.

In FIG. 6, since similar holes and hooks are formed in the shield plate 150 and the lower case 1, the guide rail may be set at these positions.

It should be noted that while the shown embodiment provides the holes and hooks at three points, the holes and hooks may be provided at two or four positions.

Figure 9:
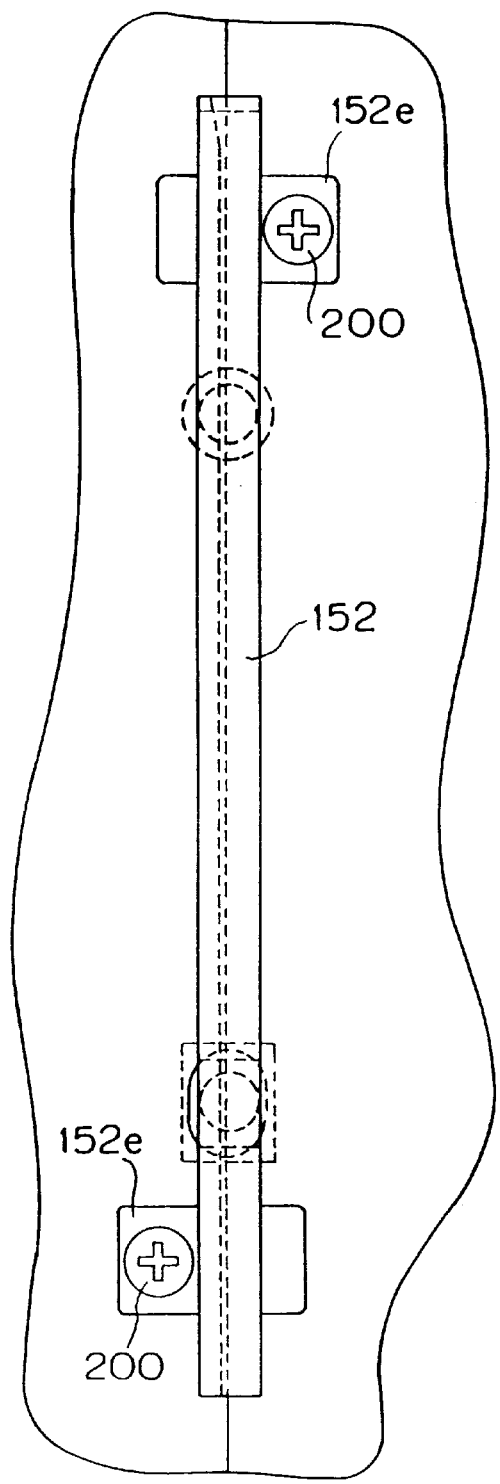
FIG. 9 is an illustration showing a detail of the circumferential portion of the guide rail in the second embodiment.

As shown in FIG. 9, it is possible to rigidly secure the flange 152e provided for the guide rail by means of screw 200. In such case, the threaded hole may be provided either in the shield plate 150 or the lower case 1. In this case, the threaded holes may be formed at a plurality of positions in the shield plate 150 or the lower case 1 so that the guide rail 152 may be fixed at a plurality of positions to permit mounting of various sizes of boards.

Figure 10:
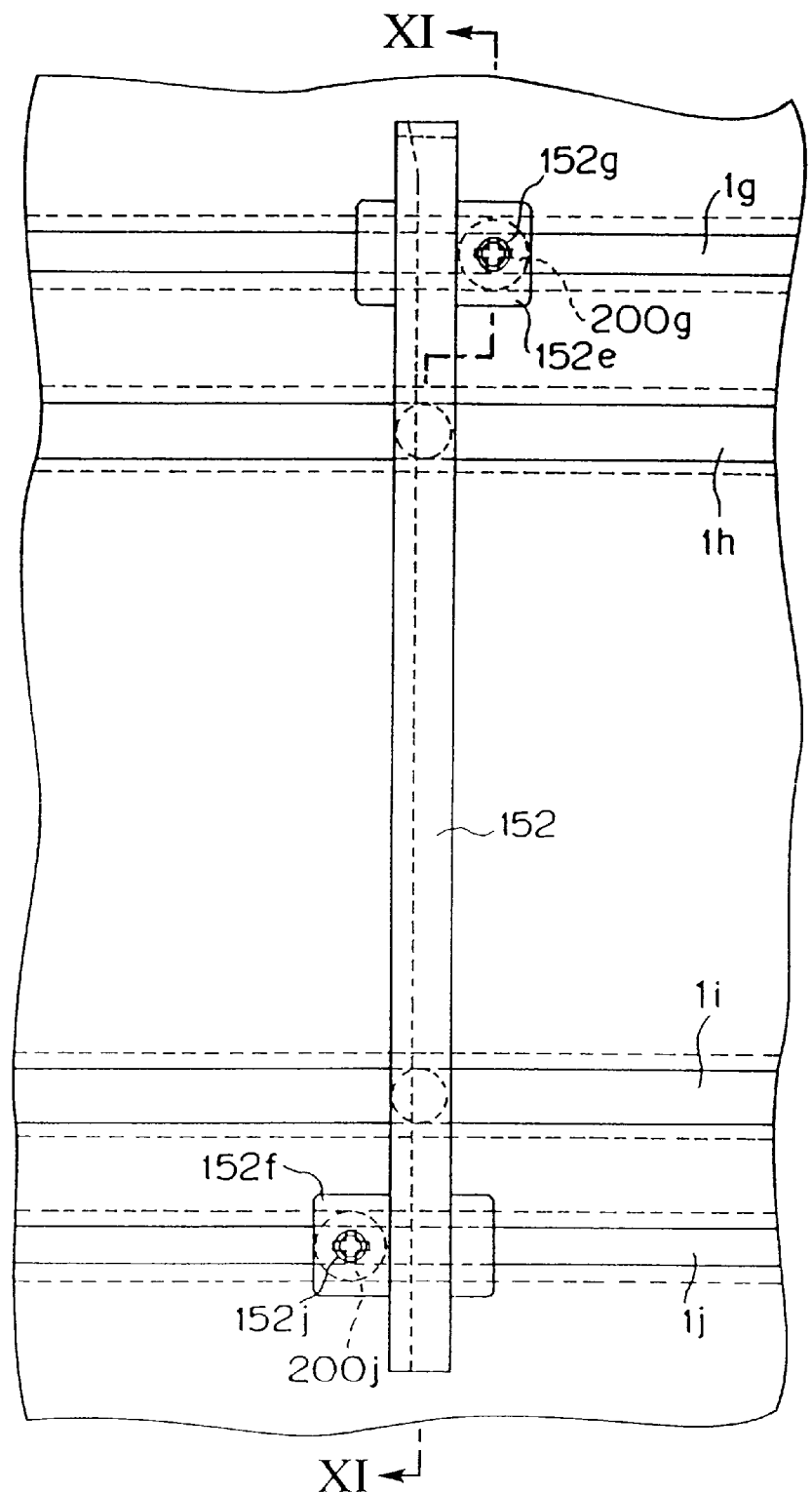
FIG. 10 is an illustration showing a detail of the circumferential portion of the guide rail in the third embodiment.
Figure 11:
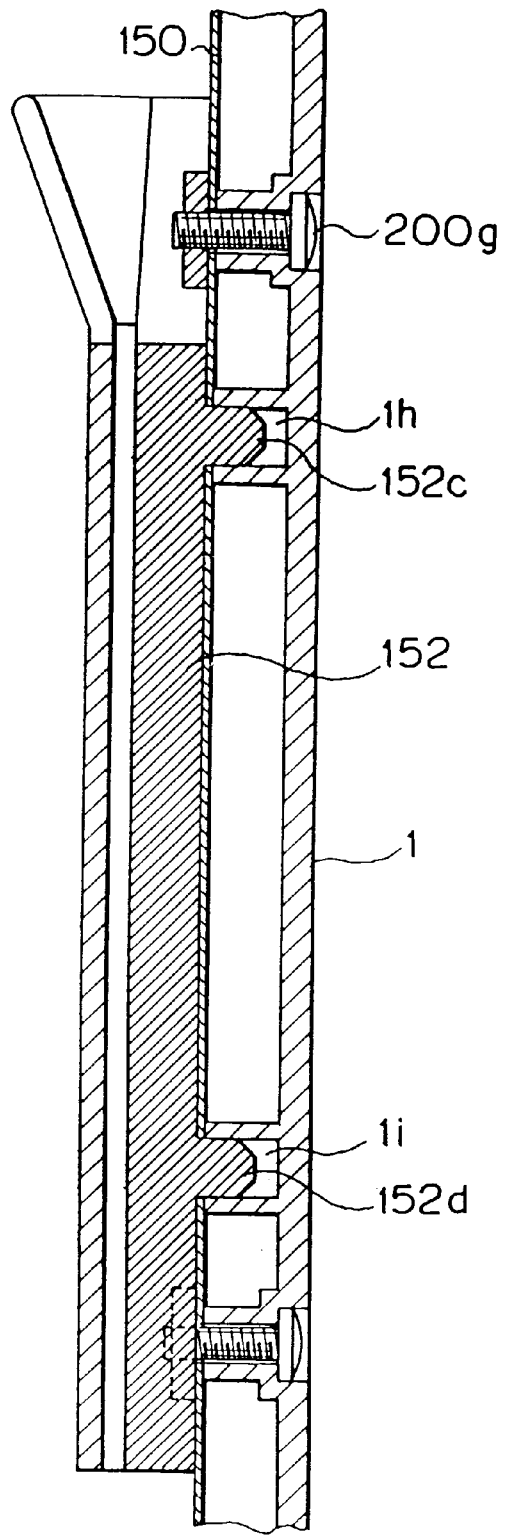
FIG. 11 is a section taken along line XI—XI of FIG. 10.

FIG. 10 shows an embodiment, in which the mounting position of the guide rail 152 can be varied in a transverse direction from the outside of the lower case. FIG. 11 is a section taken along line XI—XI.

The lower case 1 is formed with grooves 1g, 1h, 1i and 1j. At the positions respectively corresponding to the grooves, the shield plate 150 is formed with slit-like openings. The dowel 152c of the guide rail 152 is adapted to be engaged with the groove 1h. Also, the dowel 152d is adapted to engage with the groove 1i. The flanges 152e and 152f of the guide rail 152 are formed with threaded holes. Screw 200g is provided in the groove 1g for move-ment therealong. Similarly, screw 200j is provided in the groove 1h for move-ment therealong. The screws 200g and 200j are engageable with the threaded holes formed in the flanges 152e and 152f. Therefore, by tightening the screws 200g and 200j at arbitrary position of the guide rail 152, the guide rail 152 can be fixed at any desired positions. Furthermore, since the screws 200g and 200j can be loosened and tightened from the outside of the lower case 1, the position of the guide rail 152 can be adjusted without requiring opening of the upper case.

It should be noted that while the shown embodiment employs screws with +–shaped grooves, workability may be further improved by employing thumbscrews and so forth.

Figure 12:
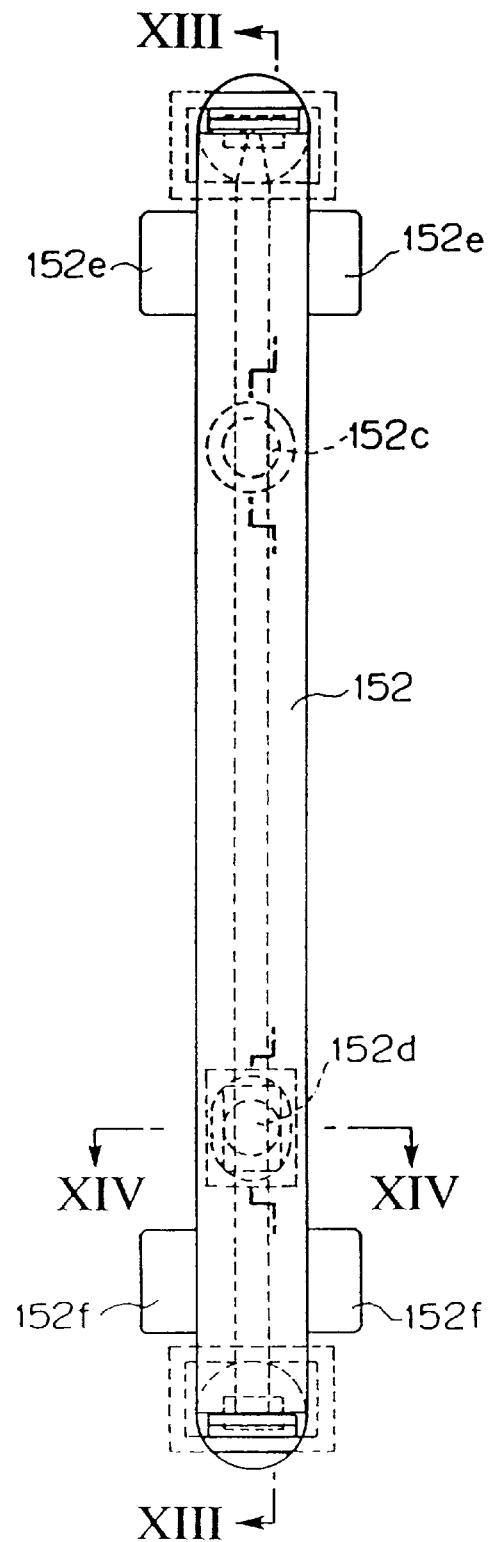
FIG. 12 is an illustration showing a detail of the circumferential portion of the guide rail in the fourth embodiment.
Figure 13:
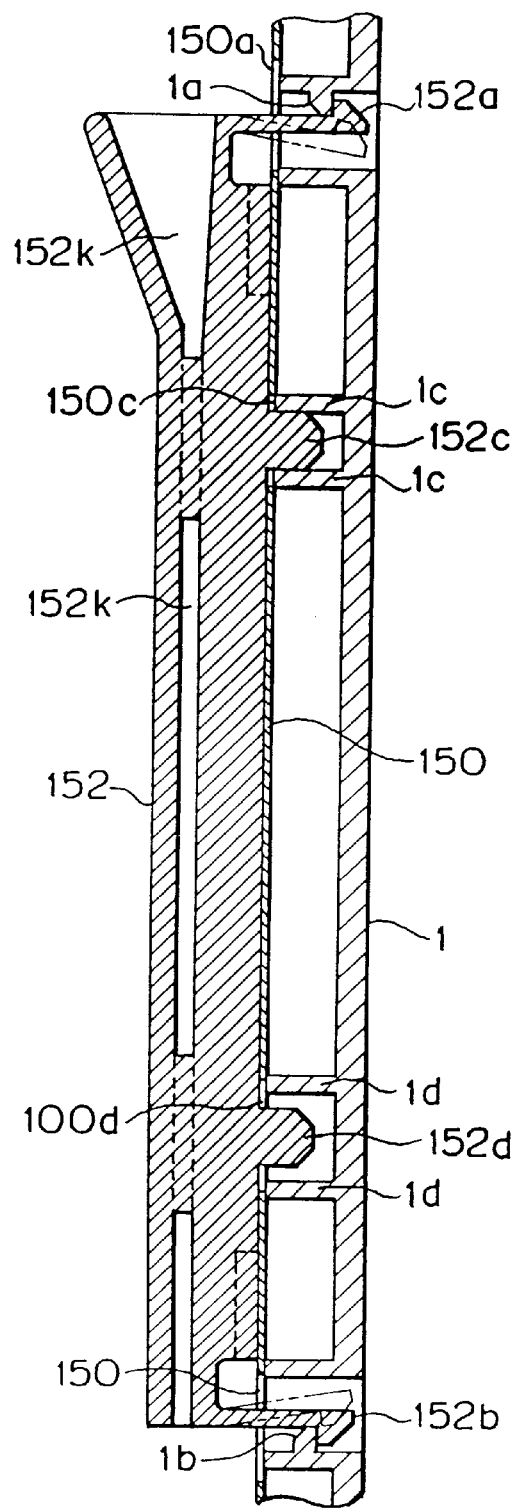
FIG. 13 is a section taken along line XIII—XIII of FIG. 12.
Figure 14:
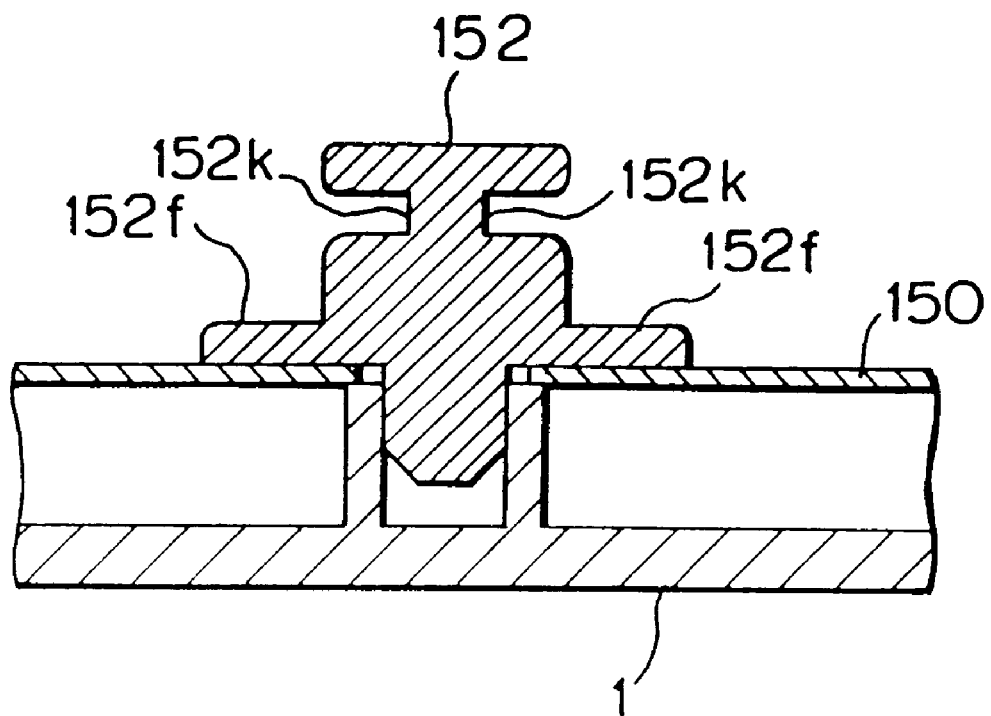
FIG. 14 is a section taken along line XIV—XIV of FIG. 12.

FIG. 12 shows the embodiment, in which the guide grooves for the guide rail 152 are provided at the left side and right side, FIG. 13 is a section taken along line XIII—XIII of FIG. 12, and FIG. 14 is a section taken along line XIV—XIV of FIG. 12. As shown in FIG. 13, the dowels 152c and 152d of the guide rail 152 are inserted into the holes 1c and 1d formed in the lower case in rib form. On the other hand, the hooks 152a and 152b of the guide rail 152 are engaged with hooks 1a and 1b of the lower case. Since the hooks 152a and 152b are deformed as illustrated by the two-dotted line, it can be set at the desired position from the upper side of the lower case in one action. Furthermore, by the flanges 152e and 152f, the guide rail 152 may be stably secured on the lower case. Also, as shown by dotted line in FIG. 15, the holes and hooks are provided at a plurality of positions on the lower case 1 so that the guide rail 152 may be positioned at a plurality of positions.

Figure 15:
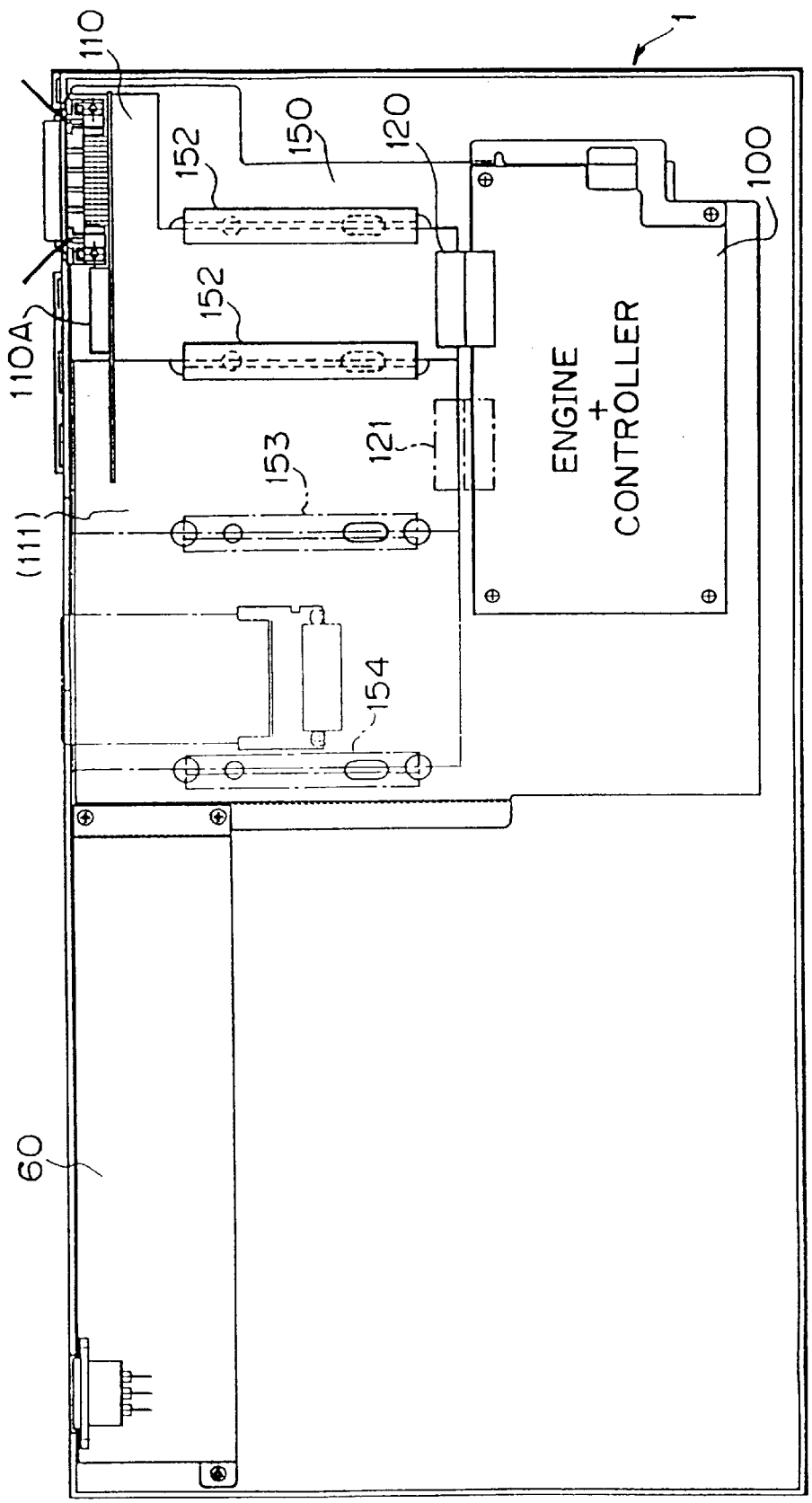
FIG. 15 is a plan view of a main apparatus, in the case where the guide rail of the fourth embodiment is installed in the main apparatus.

As shown in FIG. 14, guide grooves 152k are formed in the guide rails 152 in symmetry at left and right sides for guiding the board. Accordingly, as shown in FIG. 15, by mounting the same guide rails 152 at left and right sides of the board, the board can be guided. As shown in FIG. 15, even when the connector 120 is located at the position illustrated by the dotted line, the board can be designed without increasing the size thereof. Furthermore, it becomes unnecessary to form a plurality of kinds of guide rails. Therefore, the cost for dies can be reduced, thus contributing to lowering of the production cost of the recording apparatus.

The present invention achieves distinct effects when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof are disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Laid-Open Patent Application Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consist of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system or a preliminary auxiliary system for a recording head as a constituent of the recording apparatus because they serve to make the effect of the present invention more reliable. Examples of the recovery system are a capping means and a cleaning means for the recording head, and a pressure or suction means for the recording head. As examples of the preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than room temperature and are softened or liquefied at room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Laid-Open Patent Application Nos. 56847/1979 and 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

As can be clear from the above, according to the present invention, the interface board can be replaced with another interface board having a control portion so that the specification of the recording apparatus can be varied depending upon the manner of processing by the control portion.

Also, by the guide member, exchanging of the board can be facilitated.

As a result, the specification of the recording apparatus can be varied with simple construction.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. A recording apparatus for recording on a recording medium in accordance with data from a host system, said recording apparatus comprising:

an engine portion for controlling recording operation in the recording apparatus;

a first control portion for controlling electrical operation of said engine portion based on the data;

an interface board mounted in the recording apparatus, said interface board having a second control portion for controlling said engine portion in place of said first control portion and exchanging the data to said engine portion from the host system;

means for selecting one of a first control mode where the recording apparatus is controlled by said engine portion and said first control portion, and a second control mode where the recording apparatus is controlled by said interface board; and means for controlling the recording apparatus in accordance with a selected one of the first and second control modes.

2. A recording apparatus as set forth in claim 1, wherein when the control in said first control mode is performed, both of the engine portion and the first control portion are active, and when the control in the second control mode is performed, the first control portion is inactive and the second control portion is active.

3. A recording apparatus as set forth in claim 2, wherein, when the control in the second control mode is performed, the second control portion controls the electrical operation of the engine portion in place of the first control portion.

4. A recording apparatus as set forth in claim 2, wherein said selecting means includes means for switching between a mode where both of the engine portion and the first control portion are active, and a mode where the engine portion is active and the first control portion is inactive.

5. A recording apparatus as set forth in claim 2, wherein said switching means uses a change-over switch member to switch between the mode where both of the engine portion and the first control portion are active, and the mode where the engine portion is active and the first control portion is inactive.

6. A recording apparatus as set forth in claim 1, wherein the second control portion performs a complicated control different from the electrical control of the engine portion by the first control portion.

7. A recording apparatus as set forth in claim 1, wherein the second control portion uses the engine portion for data processing different from that by the first control portion.

8. A recording apparatus as set forth in claim 1, wherein the second control portion is for a first host system of a first interface specification and a second host system of a second interface specification which is different from the first interface specification.

9. A recording apparatus as set forth in claim 1, wherein the engine portion and the second control portion transmit and receive a command and a status via a parallel bidirectional interface.

10. A recording apparatus as set forth in claim 1, wherein the engine portion and the first control portion are disposed on the same board.

11. A recording apparatus as set forth in claim 10, wherein the second control portion is disposed on a second board detachably mounted in the recording apparatus, the second board being different from the board having the engine portion and the first control portion.

12. A recording apparatus as set forth in claim 11, further comprising a board mounting guide member for variably mounting said second board having said second control portion according to a size of said second board.

13. A recording apparatus as set forth in claim 1, further comprising ink-jet recording means for performing ink-jet recording on the recording medium.

14. A recording apparatus as set forth in claim 13, wherein said ink-jet recording means selectively performs full-color recording using a plurality of color inks and monochrome recording using black ink.

15. A method for controlling a recording apparatus for performing recording on a recording medium in accordance with data from a host system, said method comprising the steps of:

controlling recording operation in the recording apparatus by an engine portion;

controlling electrical operation of the engine portion based on the data by a first control portion;

mounting an interface board in the recording apparatus, the interface board having a second control portion for controlling the engine portion in place of the first control portion and exchanging the data to the engine portion from the host system;

selecting one of a first control mode where the recording apparatus is controlled by the engine portion and the first control portion, and a second control mode where the recording apparatus is controlled by the interface board; and controlling the recording apparatus in accordance with a selected one of the first and second control modes.

16. A method as set forth in claim 15, wherein the engine portion and the first control portion are disposed on the same board.

17. A method as set forth in claim 16, wherein the second control portion is disposed on a second board detachably mounted in the recording apparatus, the second board being different from the board having the engine portion and the first control portion.

18. A method as set forth in claim 17, further comprising the step of variably mounting the second board having the second control portion according to a size of the second board with a board mounting guide member.

19. A method as set forth in claim 15, wherein the recording apparatus is an ink-jet recording apparatus for performing ink-jet recording on the recording medium.

20. A method as set forth in claim 19, wherein the ink-jet recording apparatus selectively performs full-color recording using a plurality of color inks and monochrome recording using black ink.

* * * * *